United States Patent [19]
Walker et al.

[11] 3,945,544
[45] Mar. 23, 1976

[54] BICYCLE FRAME TOOLBOX

[76] Inventors: Charles W. Walker, 2204 Harriman, Redondo Beach, Calif. 90278; Larry K. Larson, 18421 Gaspe Circle, Huntington Beach, Calif. 92647

[22] Filed: Sept. 16, 1974

[21] Appl. No.: 506,105

[52] U.S. Cl................ 224/32 R; 248/225; 403/381
[51] Int. Cl.²........................................... B62J 9/02
[58] Field of Search........ 224/35, 32 R, 30 R, 30 A, 224/39 R, 41, 36; 248/224, 225, 360, 231; 403/381

[56] References Cited
UNITED STATES PATENTS

| | | | |
|---|---|---|---|
| 3,109,619 | 11/1963 | Krug et al. | 248/360 |
| 3,696,233 | 10/1972 | Pulsifer | 248/224 X |
| 3,795,380 | 3/1974 | Turner | 248/223 X |

FOREIGN PATENTS OR APPLICATIONS

| | | | |
|---|---|---|---|
| 476,553 | 12/1937 | United Kingdom | 224/32 R |

*Primary Examiner*—M. H. Wood, Jr.
*Assistant Examiner*—John A. Pekar
*Attorney, Agent, or Firm*—Fulwider, Patton, Rieber, Lee & Utecht

[57] ABSTRACT

A bicycle toolbox attachment including a split sleeve which is secured to the bicycle frame and which includes adaptors providing slotted bores into which split pins cantelevered from the toolbox are insertable. The pins include an oversized cap on one end and a lip projecting from the split end, the cap and lip engaging the distal surfaces of the adaptors when the pins are inserted therein.

4 Claims, 5 Drawing Figures

BICYCLE FRAME TOOLBOX

BACKGROUND OF THE INVENTION

1. Field of the Invention

The present invention relates to detachable toolboxes, and more particularly to a bicycle frame mounted toolboxes adapted for convenient removal.

2. Description of the Prior Art:

Toolboxes adapted for attachment to a bicycle frame have been known in the past. Generally, the size of such toolboxes is relatively small since the number of tools necessary to maintain a bicycle is also small, and attachment thereof can be conveniently made at any selected frame location of the bicycle. Since bicycles generally include few spring suspension devices attachment to the frame exposes the toolbox to relatively large levels of vibration. Accordingly, in the prior art relatively complex structures were required in order to secure the toolbox to the frame and to furthermore deaden or attenuate the impact of the tools against the container.

SUMMARY OF THE INVENTION

Accordingly, it is the general purpose and object of the present invention to provide a detachable bicycle frame toolbox which is conveniently mounted on a bicycle frame and which furthermore by virtue of its mounting structure reduces or attenuates the high frequency components of a road shock. Other objects of the invention are to provide a bicycle frame mounted toolbox which includes few parts and which can be arranged in any convenient orientation relative its mounting.

Further objects of the invention are to provide a bicycle frame mounted toolbox which comprises a plastic structure shaped to accommodate both a releasable mounting and shock attenuation by virtue of its configuration.

These and other objects are accomplished within the present invention by providing a cylindrical split mounting sleeve hinged along one peripheral axis for opening, to receive on the interior thereof any selected frame segment of the bicycle. Disposed along one peripheral surface of the split mounting sleeve are two split adapters, each including a transverse bore on the interior thereof communicating across a transverse slot to the distally opposed surface thereof. The split sleeve is secured to the bicycle frame following receipt of the frame on the interior by a conventional clamp and the split adapters respectively receive, within the corresponding bores thereof, corresponding split mounting pins which in turn are attached to corresponding radial web structures adapted to pass to the exterior of the adapters. The distal ends of the radial webs in turn terminate in nut retaining truss fixtures, each including a nut-receiving cavity at the juncture between the fixture and the radial web, such nut-receiving cavities being closed at the extreme distal surfaces by base planes each including a bolt hole aligned with the received nut. The toolbox is then drilled at appropriate locations to permit passage of a bolt through the toolbox wall and through the bolt holes in the fixture, such bolt then engaging the nut received in the nut-receiving cavities. In order to provide additional structural rigidity to the mounting interface between the fixture and the toolbox, the distal exterior faces of the fixture include further exteriorally projecting dimples or domes, such dimples being compressed into the surface of the toolbox upon torquing of the bolt into corresponding nuts. The split pins are retained in the transverse bores following insertion by an oversized cap on one end thereof and an exteriorally projecting lip on the other end of one of the split sections thereof. The lip extends from the peripheral distal edge of one section of the pin, such section of the cylinder being separated from the rest of the cylinder by a longitudinal slot. The cylinder is thus deformable by closing the slot gap splitting a segment thereof to permit insertion and removal thereof within the transverse bore.

In this manner, a positively secured detachable mounting fixture is formed which furthermore by virtue of its construction provides a structural interface secured in friction to thus attenuate the fundamental modes of motion and which furthermore by virtue of its structure provides a relatively low fundamental mode of resonance, thus damping or attenuating most of the passed components of road shock.

The toolbox itself is similarly constructed from plastic and includes a hinged lid secured pivotally along one longitudinal edge thereof to the toolbox itself and closed at the other peripheries by hinge flaps respectively engaging in interference fit corresponding conical projections joined to the walls of the toolbox across reduced diameter sections.

DESCRIPTION OF THE SPECIFIC EMBODIMENT

While particular reference in this disclosure is made to a toolbox, such is made only for reason of description and is not intended to limit the scope thereof and other utility for the inventively attached container is contemplated within the scope of the present description.

Figure 1:
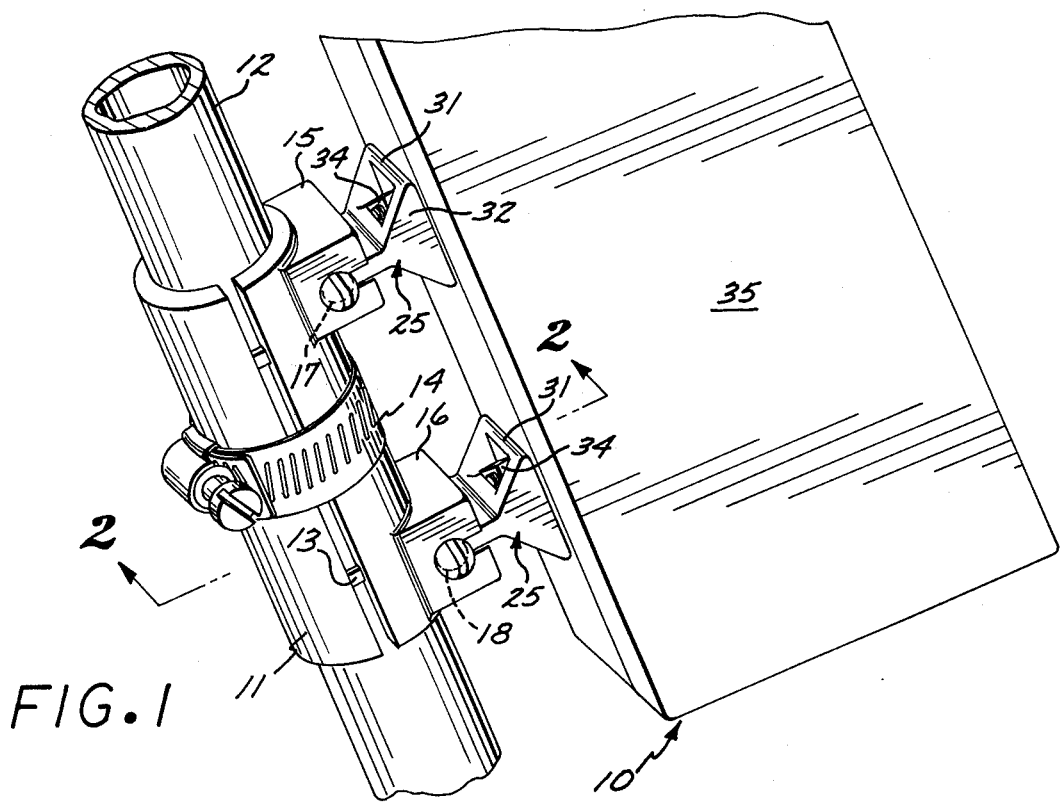
FIG. 1 is a perspective illustration of a toolbox attached to a frame segment, such toolbox being secured in position by attachment devices constructed according to the present invention.
Figure 2:
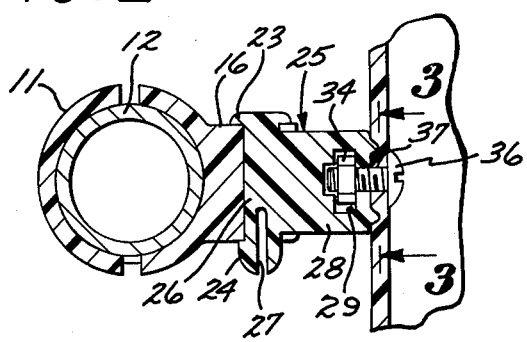
FIG. 2 is a cross sectional view of one attachment device constructed according to the present invention.
Figure 3:
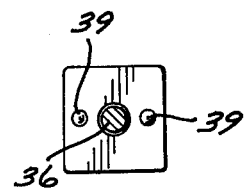
FIG. 3 is a plan view of the exterior joining face of one such inventive device.

As shown in FIG. 1, the inventive toolbox is designated generally by the numeral 10 and includes a split mounting sleeve 11 cast from a material like plastic and including an interior central bore substantially conformed to the typical exterior dimensions of a frame segment 12 of any conventional bicycle (not shown). In order to allow opening articulation of the sleeve 11 for receipt on the interior thereof of the frame segment, the tubular mount is also slotted longitudinally on the diametrically opposite periphery and connected to form an integral unit structure by a plurality of plastic strap hinges 13, as shown in FIG. 2. When placed in position, the sleeve 11 is secured to the frame segment 12 by a surrounding hose clamp 14 in a conventional manner.

The split sleeve 11 further includes on the exterior periphery thereof two radially extending adapters respectively designated 15 and 16, such adapters being aligned along one longitudinal axis of the periphery.

Adapters 15 and 16 project outwardly from the exterior peripheral surface of sleeve 11 on the interior thereof in the manner of a cube and include across the longitudinal plane of the sleeve corresponding bores 17 and 18 transversely aligned to communicate across the lateral surfaces of the adapters. Such bores are therefore aligned in the direction orthogonal to the central axis of sleeve 11. As shown in FIGS. 1 and 2, the adapters 15 and 16 further include transverse slots 19 and 20 respectively, again extending across the width thereof in planes common to the central axis of the transverse bores to provide a communicating path between the interior of the corresponding bores 17 and 18 and the distally exterior surface of the adapters.

As shown with particularity in FIG. 2, each adapter receives within the corresponding bores 17 and 18 and slots 19 and 20 a mounting fixture generally designated as fixture 25. Fixture 25 comprises a cylindrical pin 26 conformed on the exterior to the interior dimensions of the corresponding bores 17 and 18, pin 26 extending beyond the longitudinal dimensions of the bores. Extending radially from the pin 26 is a web member 28 which at the free end terminates in a nut receiving assembly 29. The nut-receiving assembly 29 is generally formed in the manner of a truss having attached thereto in cantilever the other end of the radially projecting web member 28 and including a base plate 31 joined by two longitudinal truss sections 32 to the longitudinal edges of the web member 28. In this manner, an interior cavity 33 is formed between the truss sections 32 which is conveniently sized to the minimum exterior dimensions of a nut 34. The base plate 31 therefore provides the abutting structure against which a toolbox 35 is secured by way of a securing bolt 36 which passes through a bolt hole 37 formed in the wall of the toolbox 35 and through a corresponding bore 38 through the base plate 31 to the interior of cavity 33 wherein it engages the nut 34.

Figure 4:
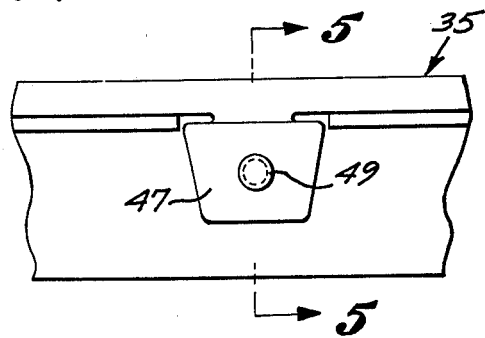
FIG. 4 is a side view of one section of the toolbox illustrating an inventive closure device.
Figure 5:
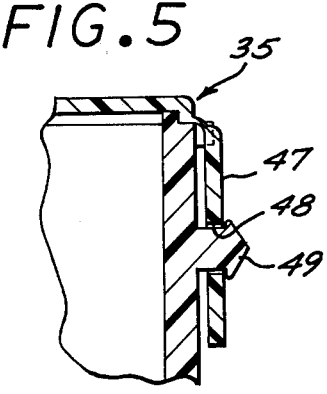
FIG. 5 is a sectional view taken along Line 5—5 of FIG. 4.

In order to provide further securing of the fixture 25 against the exterior wall of the toolbox, the distally exterior surface of base plate 31 is provided with exteriorally projecting domes or deformations 39. These deformations are compressed against or into the wall structure of the toolbox 35 upon application of torque to the bolt 36. In this manner, the fixture 25 is secured both in beam and in shear to the wall of the toolbox. Pins 26 are diametrically split by a slot 21 in a plane orthogonal to web member 28 over one end section thereof and are longitudinally retained within the corresponding bores by an oversized end cap 24 on one end and a projecting lip 23 extending from the free edge of the split section In order to facilitate a convenient closure of the toolbox itself, as shown in FIGS. 4 and 5, the toolbox is formed with a cover 45 hinged along one longitudinal edge from a wall of the toolbox. The free end of the cover 45 includes a flexibly connected flap 47 having a circular opening 48 formed to engage a correspondingly located conical projection 49 extending across a reduced diameter segment 49 (a) from the toolbox. The conical projection 49 tapers from an exteriorally projecting apex to a circular ridge 51 which is conformed to be received in interference fit within the circular hole 48. Thus the circular dimensions of the hole 48 is sized for interference fit with the maximum radial dimension of projection 49 to provide a positive lock by which the toolbox is maintained closed. When it is required that the toolbox be opened, the flexibly mounted flap 47 is pulled outwardly against the circular ridge 51 and is deformed thereacross to effect a release.

In operation, the inventive toolbox mounting fixture can be assembled in any of a number of arrangements. More specifically, a particular arrangement of toolbox 35 relative fixtures 25 can be achieved by simply selecting the drilling location of bolt holes 37. Once both holes 37 are appropriately drilled, the bolts 36 are inserted therein to engage the corresponding nuts 34 which are held in place within the cavities 33. By applying sufficient torque to deform the wall of the toolbox by the domes 39, a secure joint is made by which the web member 28 is cantelevered from the toolbox. The respective split pins 26 are then in position for insertion within the corresponding bores 17 and 18 formed in adapters 15 and 16. Pins 26 are secured longitudinally by the end cap 24 which is larger than the interior dimensions of the corresponding bore, and similarly at the other end one peripheral edge of the slotted sections of the split pin 26 is formed with a semicircle projection 23, which is sized to extend to a dimension less than the gap dimension of slot 27 such that upon deformation of the slot to a closed position, insertion of the split pin within the appropriate bore can be achieved. When insertion is fully completed, the projecting lip 23 is free to spring outwardly to securely lock the split cylinder within the interior of the bore.

It is to be noted that an additional benefit of this structure is the compound beam form of the fixtures 25. More particularly, one end of the fixture 25 is secured by friction within the corresponding bores and is thus relatively free to bend on the exterior of the slots 19 and 20. Slots 19 and 20 being slightly larger than the dimensions of the web structure received therein permit a certain degree of articulation of the split cylinders within the corresponding bores. Accordingly, much of the vibrational motions are exerted on the interior walls of the bores by way of frictional engagement. Thus, a self-damping structure is provided by which any normal modes of vibration of the box mount combination are quickly damped out. In addition, the end fixity of the web structure 28 is relatively flexible in the attachment points with the vertical truss members 32. Accordingly, a relatively low spring coefficient is obtained which, in combination with the relatively large mass of the toolbox, produces a relatively low fundamental frequency of motion of the box relative the frame. In this manner, the high frequency components of road shock which pass through the bicycle to the frame attachment point are taken out both by friction and attenuation within the inventive mounting structure.

Obviously, many modifications and variations of the present invention may be made with regard to the foregoing detailed description without departing from the spirit of the invention.

I claim:

1. A selectively attached container adapted for installation on a bicycle frame, comprising:
    a split sleeve conformed to receive on the interior thereof a segment of said bicycle frame;
    securing means for compressing said split sleeve onto said frame;
    adapter means disposed on the exterior peripheral surface of said split sleeve including a bore aligned transversely to said sleeve and a slot communicating between said bore and the exterior of said adapter means;

mounting means securable to said container, including a base member attachable to said container, a projecting element cantalevered from said base member and split pin formed on the free end of said projecting element, said element and said pin being conformed for receipt within said slot and bore respectively, said mounting means further including a nut receiving cavity formed in the juncture of said projecting element and said base member, a nut received within said cavity, a first bolt hole formed in said base member in alignment with said nut, a second bolt hole formed in said container in alignment with said first bolt hole, and a bolt inserted through said first and second nut holes to engage said nut and said pin includes a slot extending longitudinally across an end segment thereof, an end cap on the other end thereof, and a projecting lip extending from the free edge of the bolted end of said pin, the projecting dimensions of said lip being less than the gap dimensions of said slot.

2. Apparatus according to claim 1 wherein said container includes a hinged cover, said cover including hinged flaps on the free edges thereof, cones formed on said container in opposition to said flaps and securing holes formed in said flaps to engage said cones.

3. Apparatus according to claim 2 wherein said cones include exteriorly projecting ridges of a dimension greater than said securing holes.

4. Apparatus according to claim 1 wherein said container, split sleeve, adapter means and mounting means are made of plastic material.

* * * * *